United States Patent
Kroener

(10) Patent No.: US 8,075,218 B2
(45) Date of Patent: Dec. 13, 2011

(54) PRESTRESSED SHAFT AND HUB CONNECTION HAVING A PERFECT CONE SHAPE

(75) Inventor: Thilo Kroener, Kerpen (DE)

(73) Assignee: Neapco Europe GmbH, Duren (DE)

( * ) Notice: Subject to any disclaimer, the term of this patent is extended or adjusted under 35 U.S.C. 154(b) by 519 days.

(21) Appl. No.: 11/994,876

(22) PCT Filed: Jul. 6, 2006

(86) PCT No.: PCT/EP2006/006621
§ 371 (c)(1),
(2), (4) Date: Sep. 11, 2008

(87) PCT Pub. No.: WO2007/003443
PCT Pub. Date: Jan. 11, 2007

(65) Prior Publication Data
US 2009/0010708 A1 Jan. 8, 2009

(30) Foreign Application Priority Data
Jul. 6, 2005 (DE) .......... 10 2005 031 832

(51) Int. Cl.
*F16B 7/02* (2006.01)
(52) U.S. Cl. .......... 403/341; 403/293; 403/338; 403/383
(58) Field of Classification Search .................. 403/292, 403/293, 298, 335, 338, 359.1, 359.6, 361, 403/383, 409.1, 290, 337, 341
See application file for complete search history.

(56) References Cited

U.S. PATENT DOCUMENTS

| 1,552,343 | A | | 9/1925 | Quinn et al. |
| 4,043,146 | A | | 8/1977 | Stegherr et al. |
| 5,178,483 | A | * | 1/1993 | Wang ............................ 403/338 |

(Continued)

FOREIGN PATENT DOCUMENTS

DE  3636393  3/1987

(Continued)

OTHER PUBLICATIONS

International Search Report dated Dec. 1, 2006 for international application No. PCT/EP2006/006621.

*Primary Examiner* — Michael P Ferguson
(74) *Attorney, Agent, or Firm* — Summa, Additon & Ashe, P.A.

(57) ABSTRACT

The invention relates to a shaft and hub connection (20) for transmitting torque, a common longitudinal axis (X-X) comprising the following components: a shaft (22) which rotates about the longitudinal axis (X-X) and comprises an entraining longitudinal section having an untrue outer contour (26), and a hub (24) that is coaxial to the shaft (22) and encloses the shaft (22) with its internal contour (28) at least in the area of the entraining longitudinal section. The invention is characterized in that the outer contour (26) of the entraining longitudinal section of the shaft (22) and the inner contour (28) of the hub (24) have the shape of a perfect cone to such a degree that, when the shaft (22) and the hub (24) are assembled, they automatically self-lock, thereby holding the shaft and hub connection (20) together. The connection also comprises connecting means which prestress the shaft (22) and the hub (24), when assembled, in the direction of the longitudinal axis (X-X).

10 Claims, 5 Drawing Sheets

U.S. PATENT DOCUMENTS

| | | | |
|---|---|---|---|
| 5,215,413 A | | 6/1993 | Nance |
| 5,269,572 A | * | 12/1993 | Mefferd .................. 403/341 |
| 5,987,287 A | * | 11/1999 | Huang .................. 403/359.6 |
| 6,371,684 B2 | * | 4/2002 | Giesenberg et al. ......... 403/338 |
| 6,702,508 B2 | | 3/2004 | Simons et al. |
| 2004/0037628 A1 | * | 2/2004 | Meggiolan .................. 403/258 |

FOREIGN PATENT DOCUMENTS

| | | |
|---|---|---|
| DE | 9403483 | 6/1995 |
| DE | 19522736 | 1/1997 |
| DE | 19836259 | 2/2000 |
| DE | 19853411 | 5/2000 |
| DE | 10109296 | 9/2002 |
| EP | 1225356 | 7/2002 |

\* cited by examiner

PRESTRESSED SHAFT AND HUB CONNECTION HAVING A PERFECT CONE SHAPE

This application hereby claims the benefit of the commonly assigned German Patent No. 10 2005 031 832.0 (filed Jul. 6, 2005, in the German Patent Office) and the commonly assigned International Patent Application No. PCT/EP2006/06621 (filed Jul. 6, 2006, in the European Patent Office), both of which are hereby incorporated by reference in their entirety.

FIELD OF THE INVENTION

The present invention relates to a shaft/hub connection for transmitting torque, comprising the components having a common longitudinal axis:
a) a shaft, which can be rotated about the longitudinal axis comprising an entraining longitudinal section having an untrue outer contour,
b) a hub, which is coaxial to the shaft and which encloses the shaft with its inner contour at least in the area of the entraining longitudinal section.

BACKGROUND

In machine construction, such shaft/hub connections are used in many ways for transmitting torques between the shaft and the hub. In addition to many requirements, the basic task of such types of connections is usually the transmission of high torques. The connections should thereby be as compact and light as possible and they should be mountable without extensive installation and adjustment work. On principle, all of the embodiments have in common that the torque transmission loads the shaft/hub connection. Dynamic loads are thereby usually higher than static loads.

Due to the fact that, for the most part, a conventional shaft/hub connection is not an interference fit, only a certain portion of the contact surfaces truly participates in torque transmission. This causes high stresses in the components, which must be compensated for or reduced by an appropriately long connection. However, the connection's enlarged length again causes larger radial run-out and reinforces a relative motion between shaft and hub, during which no transmission of torque occurs (the so-called play). The enlargement of radial run-out also leads to undesired noises and vibrations. A longer connection moreover facilitates sliding of the surfaces upon each other, which again promotes the formation of fretting corrosion. Finally, these effects lead to a reduction in the lifetime of the shaft/hub connection and consequently that of the entire system.

DE 198 36 259 A1 shows a tight shaft/hub connection in which, to reduce or prevent the undesired play, a radial pressing device presses the hub toward the rotational axis in such a manner, that the inner contour of the hub engages the shaft free of play. The disadvantage of this embodiment is the need for additional components, which is associated with higher space requirements and costs.

Clamping set connections, in which a clamping set is disposed between the shaft and the hub, are known for reducing or preventing the undesired play. Such a clamping set encompasses at least one element, by means of which the annular cross-section of the clamping set can be enlarged and the clamping set is thus, on the one hand, pressed against the jacket surface of the shaft and, on the other hand, against the inner surface of the hub bore and a connection, which is free of play, is created. DE 36 36 393 A1 describes such clamping sets, where the positive fit is achieved in that the shaft as well as the hub are provided with a longitudinal toothing and in that the clamping set encompasses, on the inside as well as on the outside, a longitudinal toothing, which in each case corresponds thereto. Due to the additional components, this embodiment is also associated with correspondingly higher costs having a relatively high space requirement. An additional time-intensive and thus cost-intensive operating step is required for the assembly of the clamping set.

EP 1 225 356 B1 describes a shaft/hub connection, where at least one of the components encompasses, in the area of the untrue entraining longitudinal section, at least two holding sections, which are angularly displaced to each other around the longitudinal axis. This can be achieved by means of torsion, for example, which runs across the entire length of the entraining longitudinal section but also by means of two non-twisted longitudinal sections, which are connected with each other via a connecting section and which are offset against each other. A plurality of connecting sections, each of which offsets longitudinal sections in stages or continually against each other, can also be used. It is disadvantageous that the production of the components is possible only with special and very expensive machines. The creation of a twisted inner contour, in particular, is difficult. The assembling or joining of such connections is only possibly with the application of a high axial force, because the sections deform in response to being joined to each other. A joining by hand is thus not possible.

The use of wedge-shaped elements, which are inserted between shaft and hub, is also well known. However, these lead to an eccentricity of the shaft and therefore to point contacts or relatively small contact surfaces between shaft and hub. However, this is oftentimes accepted because, as already described above, an increase or an even distribution of the contact surfaces within the entraining longitudinal section only seems to be possible with additional components and with considerably effort.

It is the objective of the present invention to create a shaft/hub connection with high functionality and lifetime. In response to a simple construction, the best possible transmission of the torque is to be achieved. The production of the components is to be simple and cost-efficient and the connection is to furthermore be capable of being assembled with little effort.

SUMMARY OF THE INVENTION

According to the invention, this is achieved by means of a generic shaft/hub connection, which is characterized in that
the outer contour of the entraining longitudinal section of the shaft and the inner contour of the hub have the shape of a perfect cone to the extent that, when the shaft and the hub are joined, they automatically self-lock, thereby holding the shaft and hub connection together,
a connecting means prestresses the shaft and the hub, when joined, in the direction of the longitudinal axis X-X.

The invention is based on the knowledge that a reduction of the play between shaft and hub can only diminish or neutralize high stresses in the component, fatigue, true running, and vibrations and can only lead to the objective, if, on the one hand, a self-locking can occur between the shaft and the hub and if, on the other hand, the connection remains permanently prestressed in axial direction.

An accurate centricity of the shaft in the hub ensures an even torque transmission. The reduction or neutralization of play in a centered shaft leads to a more favorable distribution of energy during torque transmission, thereby reducing stresses in the component, fatigue, true running, and vibrations. It is easy and quick to join, especially to thread, or to insert the connection together.

The shaft/hub connection according to the invention can furthermore be produced and assembled in a very simple manner. In a particularly advantageous embodiment version, provision is made for a prestressing ring as connecting means, which stresses the shaft and the hub in axial direction. For this purpose, the shaft and the hub each have a circumferential ramp-shaped elevation, which is disposed relatively close to each other when the shaft and the hub are joined. During the joining, the prestressing ring is placed above these ramps and is contracted. The contracting leads to the reduction of the diameter of the prestressing ring, thereby causing the lateral flanks of the prestressing ring to come into contact with the ramps and pressing them on top of each other. Once sufficient prestress has been applied, the prestressing ring is fixed and remains in its position. The prestressing ring is made from a resistant material and is advantageously balanced.

In addition to the mentioned prestressing ring, other connecting means can also be used as connecting means. Provision can be made, for example, for a coupling nut, which clamps the shaft with the hub via a thread and the contact surface disposed on the other component with each other.

According to the invention, the outer contour of the hub and the inner contour of the shaft have the shape of a perfect cone in the area of the entraining longitudinal section. This means that all of the contour lines disposed on the jacket surface and running substantially in longitudinal direction taper towards a single point, which is disposed on the longitudinal axis, and intersect with one another in this point. In other words, the shape of a perfect cone is given if a theoretical extension of all of the essential cone angles intersects the longitudinal axis in a single point.

Due to the fact that the shaft as well as the hub has corresponding contours of a perfect cone in the area of the entraining longitudinal section, a so-called positive fitting is the result in response to correspondingly adapted diameters or cross-sections, which leads to a laminar attachment and to a self-locking.

With only very little expenditure of energy, the shaft and the hub can be joined in such a manner that they remain in a relatively solid connection due to the self-locking. The shape of a perfect cone furthermore causes the shaft and the hub to be compulsorily centered to each other in response to the joining. The connection is thus completely free of play and avoids all of the disadvantages associated with an undesired play. The transmission of forces takes place across a relatively large surface, thus avoiding load peaks.

Polygonally shaped, especially trochoidally shaped cross sections of the shaft and hub have proven to be advantageous. A trochoid arises as the trajectory of a point as the point is carried along when a circle (moving circle) rolls along on or in a circle (rest circle). The number of and embodiment of the trochoidal "indentations and bulges" are variable. It has been shown that it is possible to transmit torque with minimum stress and, at the same time, with minimum relative motion between touching surfaces by using a trochoidal contour that has been optimized with respect to the number of "indentations and bulges" and to their large and small diameters. Small differences in the contour of the touching components enable the properties of the shaft/hub connection to be changed, its lifetime and stability in particular.

Optionally, provision can be made for an additional sealing element between the shaft and the hub. To avoid corrosion, a sealing of the polygon section is sensible under sustained loading. Such a sealing can also be sensible if the shaft/hub is used in all-terrain vehicles or in construction machinery.

The shaft/hub connection according to invention is particularly suited for a use in automotive technology, for example for braking systems, wheel suspensions or as connections for joint and prop shafts of motor vehicles. It is advantageous hereby that a hub according to the invention having a polygonal inner contour must not be machined during the production process. It is consequently unnecessary to manufacture it out of steel; the hub could also be produced from cast iron, for example. The shaft/hub connection according to the invention is thus also particularly well suited for such a use, because brake systems, for example, are subjected to high thermal loads.

Further advantageous embodiment characteristics of the invention are included in the subclaims as well as in the following description.

BRIEF DESCRIPTION OF THE DRAWINGS

The invention shall be explained in more detail below based on preferred embodiments illustrated in the drawings.

DETAILED DESCRIPTION

Figure 1:
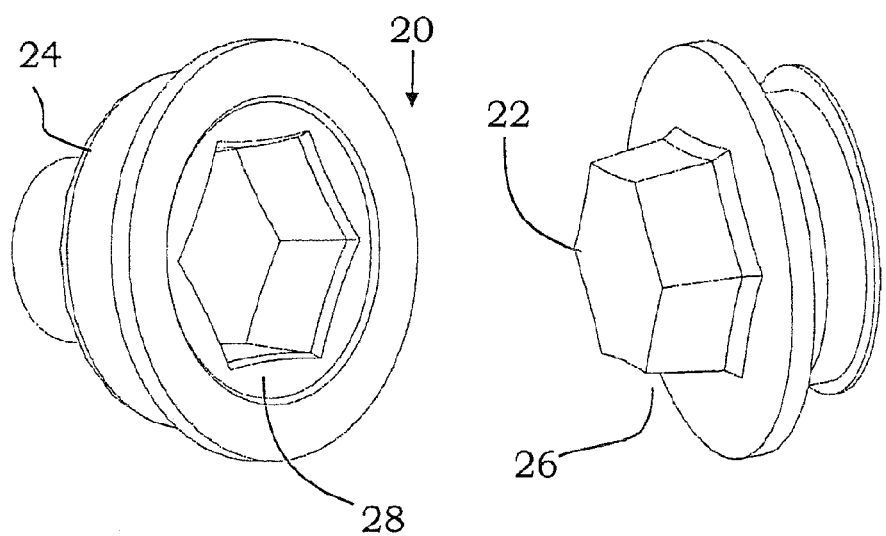
FIG. 1 shows a perspective view of a shaft/hub connection having the shape of a perfect cone.

FIGS. 1 to 6 clarify the function and the configuration of a shaft/hub connection 20 as claimed in the invention. The shaft/hub connection 20 has a shaft 22 and a hub 24, wherein the shaft 22 with its outer contour 26 rests against an inner contour 28 of the hub 24. This area, in which a torque can be transmitted, will be referred to hereinbelow as entraining longitudinal section.

The shaft 22 and the hub 24 are disposed so as to be concentric to a longitudinal axis X-X and rotate around said longitudinal axis during the torque transmission. The shaft 22 has trochoidal bulges and the hub 24 has trochoidal indentations relative to its cross section. However, all other out-of-round cross sectional shapes are also fundamentally suitable for implementing the invention. A six-sided polygon in particular has proven to be particularly suitable for transmitting the torque. It has likewise been shown for a six-sided polygon that a relative eccentricity E of between 2% and 10%, preferably between approximately 3% and 5% should be specified. The relative eccentricity E describes the eccentricity of the polygon relative to the non-physical average diameter Dm expressed in percent, that is, it describes a relation between an outer diameter Do and an inner diameter $D_i$ of the polygon. $D_m$ is the diameter of a circular disk having the same surface content as the polygon. The term polygon is not to be understood here within its strictest meaning, but rather as an approximate, polygon-like shape. The relative eccentricity E can be computed according to the following formula:

$$E = \epsilon/D_m * 100$$

where
ε=polygon's out-of-roundness

The relative eccentricity E should be advantageously derived from the following formula:

$$E=(D_o-D_i/D_o+D_i)\times 50$$

Figure 2:
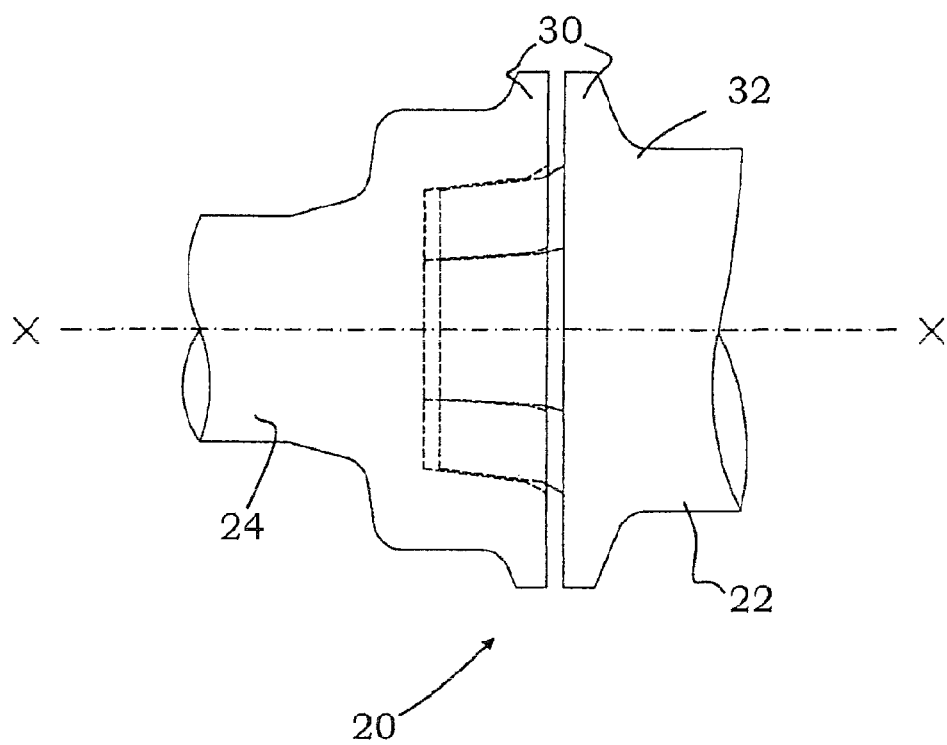
FIG. 2 shows a cross section of the shaft/hub connection from FIG. 1 along a longitudinal axis.

Particularly advantageous polygonal shapes arise from the use of IPROTEC process and can in particular be computed according to the following formulas (deviation +/−10%):

$$x(\gamma)=(D_m/2)\times\cos(\gamma)+\epsilon\times\cos((n-1)\times\gamma)$$

$$y(\gamma)=(D_m/2)\times\sin(\gamma)-\epsilon\times\sin((n-1)\times\gamma)$$

where
γ=0 to 360°, continuous parameter
n=number of sides of the polygon
ε=polygon's out-of-roundness FIGS. 1 and 2 clarify how the shaft 22 can be inserted into the hub 24. As can be seen in particular from FIG. 3, the outer contour 26 and the inner contour 28 have the shape of a perfect cone. This means that the relative eccentricity E across the length of the entraining longitudinal section is constant.

As results in particular from FIG. 2, the entraining longitudinal section is very short towards the longitudinal axis X-X. It has been shown that the entraining longitudinal section can be shortened by up to 60% with comparable torques, which are to be transmitted, as compared to conventional connections. On the one hand, the production costs are reduced with this shortening and, on the other hand, the overall size of the shaft/hub connection 20 is reduced as well. Vibrations and unintentional fretting corrosion are also minimized. The minimally possible length of the entraining longitudinal section is the length that allows for the safe transmission of the desired torque.

Advantageously, the length of the entraining longitudinal section is only up to 40%, in particular only up to 33% of the average cone diameter of the cross section of the untrue entraining longitudinal section. On principle, however, other aspect ratios can also be used, depending on the embodiment of the connection.

Two circumferential ramps 30 as claimed in the invention, each of which are provided at the shaft 22 and at the hub 24 and which run coaxially around the longitudinal axis X-X, become apparent from FIG. 2. In the illustrated exemplary embodiment, each of the ramps 30 has a slope 32 approaching each other in the direction away from the shaft/hub connection 20. The ramps 30 comprising the slopes 32 serve the purpose of attaching the connecting means shown in FIG. 4, which is embodied as a prestressing ring 34 in the illustrated exemplary embodiment.

To be able to apply sufficient prestress, the prestressing ring 34 is placed above the ramps 30 after joining the shaft 22 and the hub 24 and the inner side of said prestressing ring 24 comes into contact with the slopes 32. Due to the reduction of the diameter of the prestressing ring 34, said prestressing ring 34 pushes against the slopes 32 and presses the ramps 30 towards one another.

Figure 3:
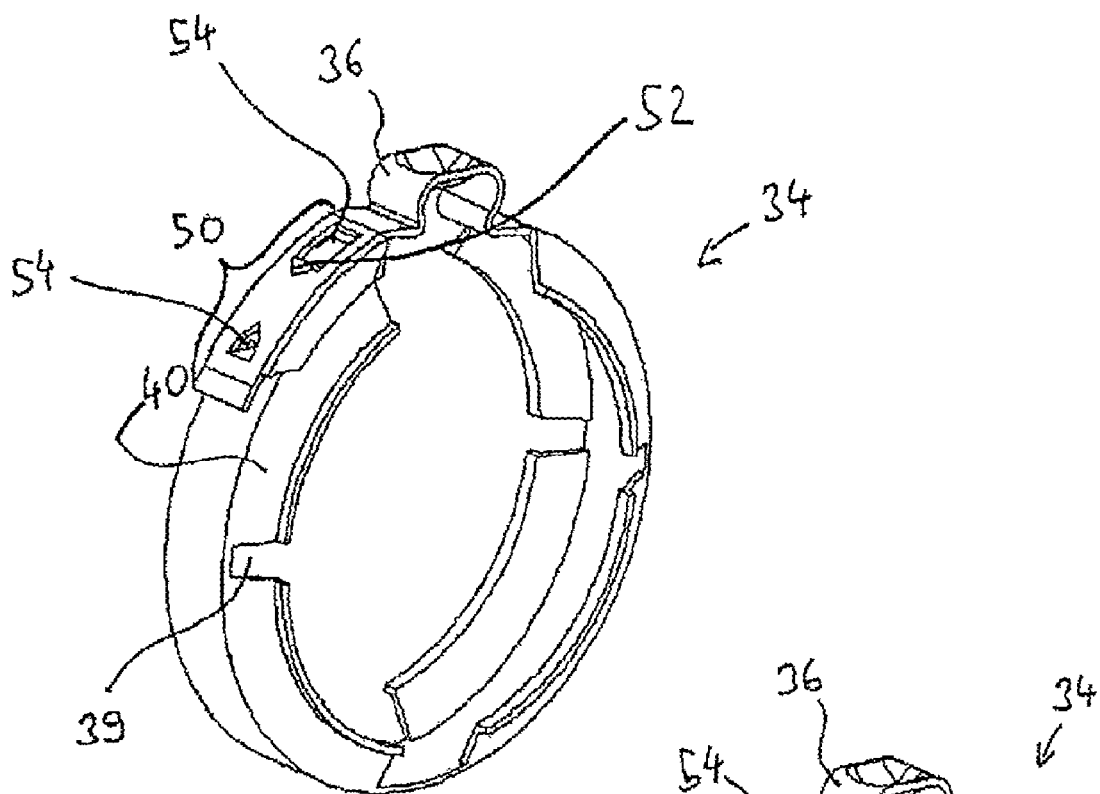
FIG. 3 shows a prestressing ring according to the invention in a perspective view, closed.
Figure 4:
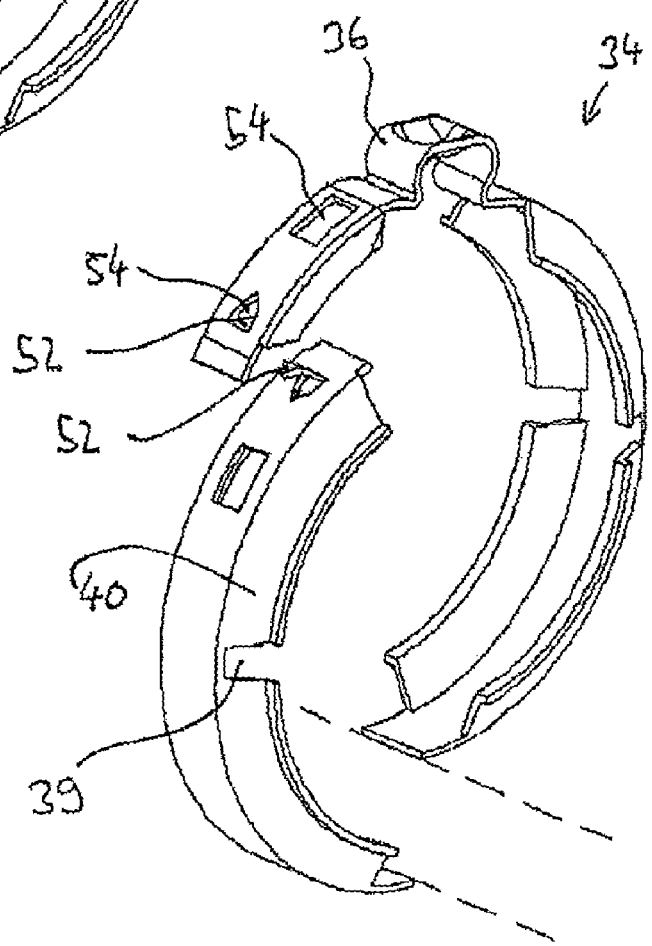
FIG. 4 shows a prestressing ring according to the invention in a perspective view, closed, opened, partially cut.

The prestressing ring 34 is clearly shown in particular in FIGS. 3 and 4, wherein, for an improved illustration, the prestressing ring 34 in FIG. 4 is illustrated in two parts, wherein the two parts are offset to one another to a certain extent. The reduction of the diameter of the prestressing ring can be carried out by means of a so-called ear 36, which is compressed by means of a suitable tool. This method can be carried out in a rapid and simple manner and leads to a very even and constant prestressing force across the entire periphery of the ramps 30. Nonetheless, there are also other possibilities, for example connecting means, which are joined by means of screws. It has been shown that the connecting means is to be balanced, because it rotates in response to the torque transmission. However, the balancing is not necessary for applications with low speeds. The inner side of the prestressing ring 34 has a profile, which is adapted to the ramps 30 or the slopes 32 in such a manner that a reduction of the diameter causes a prestressing force to act on the slopes 32. The connecting means creates a prestressing force, which is sufficient for maintaining the shaft/hub connection 20 in a self-locking state. In the instant exemplary embodiment, the prestressing ring 34 has side walls 38, the inner sides of which each come into contact with the slopes 32. The side walls 38 can be embodied so as to be continuous, but they can also be interrupted by means of indentations 39 so that a plurality of side walls sections 40 is embodied. It is important that the side walls 38 are embodied in such a manner that the force, which is summoned up by said side walls 38, acts as evenly as possibly across the periphery of the ramps 30 in axial direction. In the illustrated exemplary embodiment, four side wall sections 40 are shown for each side. However, up to twenty side wall sections are also possible.

The prestressing ring 34 has two free ends. Starting from the free ends, an overlapping section 50 results, above which end regions of the prestressing ring 34 overlap in the closed state. The overlapping section 50 has a length of from approximately 10 to 20% of the outer periphery of the prestressing ring 34 and is limited by the free ends. In the region of the overlapping section 50, the two end regions each have a clamp 52 and an opening 54, which are disposed in such a manner that the two clamps 52 can be hooked into the corresponding opening 54 of the other end region. If the ear 36 is crimped or compressed, the clamps 52 contract the prestressing ring 34 via the attachment on an edge of the corresponding opening 54.

An important advantage of the invention is also that the same or different materials can be used for the production of the shaft 22 and/or the hub 24. The hub 24 can be made from cast iron, for example, while the shaft 22 is made from steel. Further materials, which are suitable for manufacturing, include ceramics, aluminum, MMC as well as globular or laminar cast iron. Combinations of the different types of materials can also be used.

Figure 5:
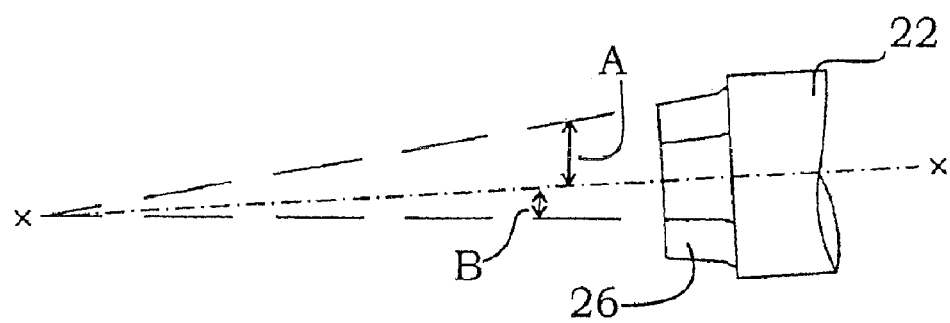
FIG. 5 shows a shaft according to the invention in side view, wherein the contour in the shape of a perfect cone is clarified by means of artificial lines.

As can be seen from FIG. 5, contour lines of the outer contour 26 running approximately in longitudinal direction X-X intersect in a single point on the longitudinal axis X-X, if they are theoretically extended. Shown is a cone angle A, which is included by the longitudinal axis X-X and by a line attached at a maximum diameter of the shaft 22 and a cone angle B, which is included by the longitudinal axis X-X and by a line attached at a minimal diameter of the shaft 22. The cone angle A can also be referred to as outer cone angle A; the cone angle B can also be referred to as inner cone angle B. It has been shown that the desired self-locking is made possible in a reliably manner by means of an outer cone angle of between 0.5° and 7°. If the inner contour 28 of the shaft 22 is embodied in a corresponding manner, the result of the joining of the shaft 22 and of the hub 24 is a laminar contact, which provides for an optimal torque transmission. However, it is also important therein that the state of the self-locking is reached in response to a joining, that is, when the outer contour 26 attaches on the inner contour.

Figure 6:
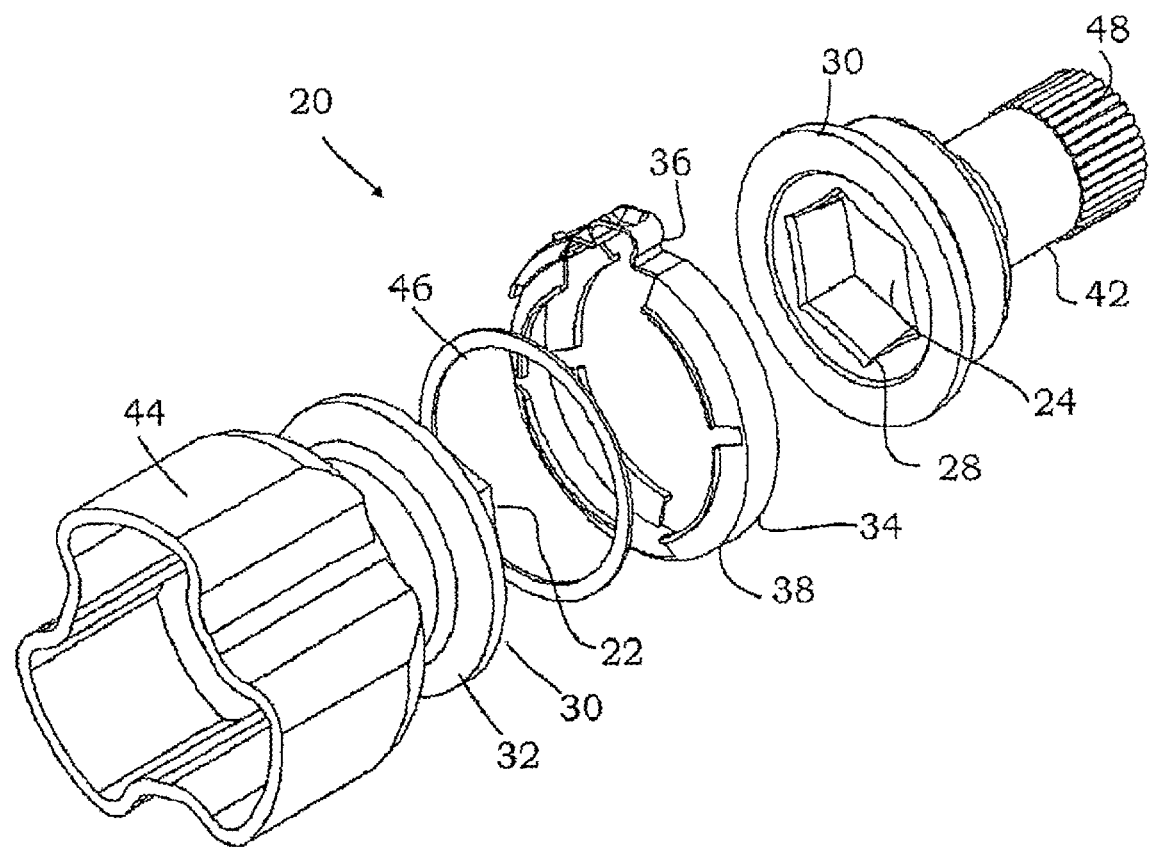
FIG. 6 shows a perspective view of an embodiment version of a shaft/hub connection according to the invention having a profiled prestressing ring as connecting means.

FIG. 6 shows a preferred field of application of the shaft/hub connection 20, that is, as connection of a drive shaft 42 with a constant velocity joint 44. For this purpose, the shaft/ hub connection 20 can also be integrated with a slip joint. In the end region, the drive shaft has splines 48 for the torque transmission.

Preferably, the side walls 38 have an angle of between 20° and 28°, wherein the angle describes the deviation from a plumb line to the longitudinal axis X-X. Even though this angle region has proven to be advantageous, other angles can also be used, depending on the field of application.

The prestressing ring 34 creates the prestressing in that the side walls 38 or the side wall sections 40 deform elastically. To ensure a sufficiently sound deformation of the side walls 38, the side walls 38 or the side wall sections 40 should have a smaller angle than the slopes 32. It has been shown that an angle of between 14° to 22° in combination with the above-mentioned angles works very well for the slopes 32.

To simplify assembly, the prestressing ring 34 is embodied so as to be open in a preassembly state, wherein the free ends of the prestressing ring 34 overlap in sections. In the overlapping area, in the area of the one free end, a recess is disposed, into which a clamp, which is disposed in the area of the other free end, can be hooked. The ear 36 merges into the normal periphery of the prestressing ring 34 via two journals and thus has the approximate shape of an omega. After the hooking and the plastic deformation of the ear 36, the diameter of the prestressing ring is reduced, so that the journals of the ear 36 can be pressed towards one another and the side walls elastically deform at the ramps 30 and hold the shaft 22 and the hub 24 together under prestress.

The use of an ear 36 is very cost-efficient and permits a simple and rapid tightening of the connection. Needless to say, other devices, such as a knee lever, screw connections or the like, are also possible, instead of an ear 36.

The prestressing ring 34 is able to cover a gap distance between the two ramps 30 of the shaft 22 and of the hub 24 and can nonetheless create sufficient prestress.

Advantageously, the prestressing ring 34 can be connected with the shaft 22 or with the hub 24 already prior to the joining of the shaft/hub connection 20. This clearly simplifies the assembling once more.

In the illustrated exemplary embodiment, an additional sealing element 46, which is designed as an O-ring, is disposed between the shaft 22 and the hub 24.

The foregoing description only serves for comprehending the invention and is not to be understood to be limiting. Instead, the described exemplary embodiment represents only a very advantageous realization of the invention.

What is claimed is:

1. A shaft/hub connection (20) for transmitting torque, comprising the following components having a common longitudinal axis (X-X):
   a shaft (22), which can be rotated about the longitudinal axis (X-X), the shaft comprising an entraining longitudinal section having a polygonal or trochoidal outer contour (26);
   a hub (24), which is coaxial to the shaft (22) and which encloses the shaft (22) with a longitudinally extending end recess having a corresponding polygonal or trochoidal inner contour (28) at least in the area of the entraining longitudinal section; and
   a connecting means that prestresses the shaft (22) and the hub (24) when in a joined state, towards the longitudinal axis (X-X);
   wherein the outer contour (26) of the entraining longitudinal section of the shaft (22) and the inner contour (28) of the hub (24) have the shape of a perfect cone to such an extent that, when the shaft (22) and the hub (24) are joined, the shaft and the hub automatically frictionally self-lock, thereby holding the shaft/hub connection (20) together;
   wherein the connecting means is formed by a prestressing ring (34), which encompasses ramps (30), which are respectively disposed on an outer side of the shaft (22) adjacent the entraining longitudinal section and on an outer side of the hub (24) adjacent the recess, and which revolves around the longitudinal axis (X-X) and thus holds the shaft/hub connection (20) under prestress;
   wherein the prestressing ring (34) has a circumferential sidewall (38) and a plurality of circumferentially spaced side wall sections (40) that clampingly engage the ramps and deform elastically at the ramps (30) of the outer side of the shaft (22) and the outer side of the hub (24) when the prestressing ring is secured to the shaft and hub; and
   wherein the axial length of the entraining longitudinal section is up to 40% of the average cone diameter of the cross section of the polygonal or trochoidal entraining longitudinal section.

2. The shaft/hub connection (20) according to claim 1, wherein the outer contour (26) and the inner contour (28) has a polygonal shape.

3. The shaft/hub connection (20) according to claim 2, wherein the outer contour (26) of the shaft (22) in the area of the entraining longitudinal section has an outer cone angle (A) of from 0.5° to 7°.

4. The shaft/hub connection (20) according to claim 3, wherein the shaft (22) has a six-sided outer contour (26) and the hub (24) has a six-sided inner contour (28), wherein the relative eccentricity E amounts to between 3% and 5% and is computed according to the formula $E=(D_O-D_i/D_O-D_i) \times 50$, wherein $D_O$ is the outer diameter of the contour and $D_i$ is the inner diameter of the contour.

5. The shaft/hub connection according to claim 2, wherein the polygonal contours can be determined by the following formulas:

$$x(\gamma)=(D_m/2)\times\cos(\gamma)+\epsilon\times\cos((n-1)\times\gamma)$$

$$y(\gamma)=(D_m/2)\times\sin(\gamma)-\epsilon\times\sin((n-1)\times\gamma),$$

wherein $D_m$ is the diameter of a circular disk having the same surface content as the polygon;
wherein $\gamma$ is a continuous parameter 0° to 360°;
wherein n is the number of sides of the polygon;
wherein $\epsilon$ is the out-of-roundness of the polygon; and
x and y are coordinates.

6. The shaft/hub connection (20) according to claim 1, wherein the ramps (30) each have a slope (32) approaching each other in the direction away from the shaft/hub connection (20) and cooperating with an inner side of side walls (38) of the prestressing ring (34).

7. The shaft/hub connection (20) according to claim 6, wherein the slopes (32) of the ramps (30) include an angle of from 20° to 28° and wherein the side walls (38) include an angle of from 14° to 22°, in each case with a plumb line on the longitudinal axis (X-X).

8. The shaft/hub connection (20) according to claim 1, wherein the prestressing ring (34) in its circumference has an ear (26) pointing outwards and having the shape of an omega, via which the diameter of the prestressing ring (34) can be reduced by pressing together the sides of the omega.

9. The shaft/hub connection (20) according to claim 1, wherein the prestressing ring (34) is embodied so as to be balanced for rapidly rotating connections.

10. A shaft/hub connection (20) for transmitting torque and defining a common longitudinal axis (X-X), the shaft/hub connection comprising:
- a shaft (22) which can be rotated about the longitudinal axis (X-X) of the shaft/hub connection, the shaft comprising an entraining longitudinal section having a polygonal or trochoidal outer contour (26), the shaft defining a ramp (30) disposed along an outer side of the shaft adjacent the entraining longitudinal section, the ramp extending around the longitudinal axis (X-X);
- a hub (24) positioned coaxial to the shaft (22) and having a longitudinally extending end recess having a corresponding polygonal or trochoidal inner contour (28) that encloses at least a portion of the entraining longitudinal section of the shaft, the hub defining a ramp (30) disposed along an outer side of the hub adjacent the recess and extending around the longitudinal axis; and
- a prestressing ring (34) having side walls (38), the ring surrounding the ramps of the shaft and hub, and applying a prestressing force against the shaft (22) and the hub (24) when connected, the prestressing ring (34) having a circumferential sidewall (38) and a plurality of circumferentially spaced side wall sections (40) that clampingly engage the ramps and deform elastically at the ramps (30) of the outer side of the shaft (22) and the outer side of the hub (24) when the prestressing ring is secured to the shaft and hub;
- wherein the polygonal or trochoidal outer contour (26) of the entraining longitudinal section of the shaft (22) and the inner contour (28) of the hub (24) have the shape of a perfect cone such that the shaft (22) and the hub (24) automatically frictionally self-lock when joined, thereby holding the shaft/hub connection (20) together; and
- wherein the axial length of the entraining longitudinal section of the shaft is up to 40% of the average cone diameter of a cross section of the polygonal or trochoidal entraining longitudinal section of the shaft.

* * * * *